No. 623,571. Patented Apr. 25, 1899.
W. S. SHIPE.
MEAT SKEWER.
(Application filed Apr. 17, 1897.)
(No Model.)
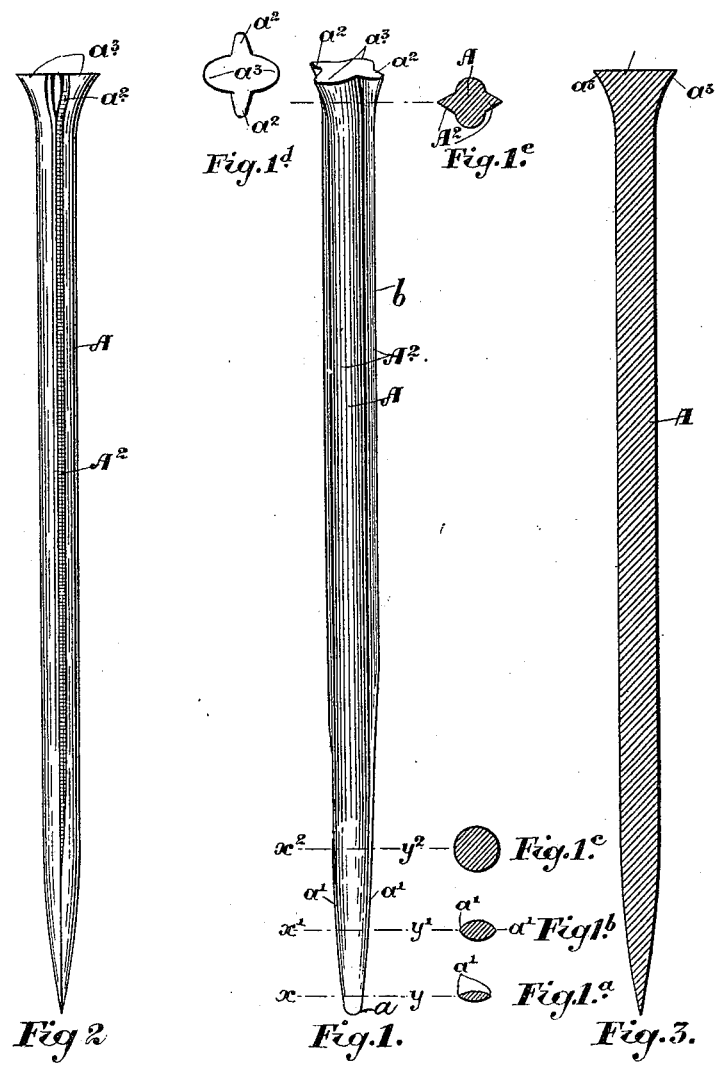

UNITED STATES PATENT OFFICE.

WALTER SCOTT SHIPE, OF TORONTO, CANADA.

MEAT-SKEWER.

SPECIFICATION forming part of Letters Patent No. 623,571, dated April 25, 1899.

Application filed April 17, 1897. Serial No. 632,645. (No model.)

*To all whom it may concern:*

Be it known that I, WALTER SCOTT SHIPE, of the city of Toronto, in the county of York, in the Province of Ontario, Canada, have invented certain new and useful Improvements in Meat-Skewers, of which the following is a specification.

My invention relates to improvements in meat-skewers; and the object of the invention is to devise a wooden skewer which can be more readily inserted in the meat and more readily withdrawn therefrom than the common skewer at present in use; and it consists, essentially, of a skewer provided with a broadened knife-edge point projecting longitudinally, knife-edge ribs, and an enlarged flaring head constructed in the manner hereinafter more particularly explained.

Figure 1 is a perspective view of a skewer constructed in accordance with my invention. Figs. 1$^a$, 1$^b$, and 1$^c$ are cross-sections near the point of the skewer. Figs. 1$^d$ and 1$^e$ are a plan and cross-section of the head. Fig. 2 is a side view. Fig. 3 is a longitudinal section through Fig. 2.

In the drawings like letters of reference indicate corresponding parts in each figure.

A is the body of the skewer, which is provided with a knife-edge point A', having preferably a semicircular knife-edge $a$ at the tip of the point. The thickness of the skewer at the cross-section of $x\ y$ is very slight, as indicated by Fig. 1$^a$. The thickness increases at $x'\ y'$, as indicated in Fig. 1$^b$, still presenting knife-edges $a'$, and the thickness at $x^2\ y^2$, Fig. 1$^c$, is such that the cross-section is circular, as indicated.

$A^2$ are longitudinal ribs having knife-edges $b$. The form of these ribs is indicated in Fig. 1$^c$. At the point end the ribs merge into the body of the skewer, still preserving the knife-edge. At the head of the skewer the ribs A are flared out into the wings $a^2$ and rounded off in order to enable it to be grasped. The end of the intermediate body portion is also flared out into semi-oval wings $a^3$, thus providing a four-winged flaring head the construction of which will clearly appear on reference to Figs. 1 and 1$^d$.

The advantages of my skewer over others will now be apparent. The old skewer enters the meat by wedging the fiber of the meat apart. My skewer, however, with its knife-point and knife-edges, cuts the fiber, thus causing it to enter more easily. As the head is enlarged and flaring and winged, it will be readily understood that it will be more easily withdrawn, as it may be first turned in the meat.

In practice it will be understood by those accustomed to the use of skewers that the turning of a skewer is necessary to loosen it in the meat, and I find that the turning is more easily accomplished with the knife-edge skewer such as I describe. Again, as the head is enlarged it may be readily gasped and much more readily withdrawn. The butchers will appreciate the point and knife-edges of the skewer in inserting it into the meat, while their customers will appreciate the knife-edge ribs and winged head in turning and extracting it. It will also be apparent that the head presents an enlarged surface, enabling it to be pressed upon with less danger of injury to the hand, and consequently with greater force.

Although I show my skewer provided with longitudinal ribs, it will be understood that such ribs might be dispensed with, in which case the end of the head would be substantially oval in form and present merely two outwardly-flaring wings.

What I claim as my invention is—

1. A skewer having a tapering body rounded in cross-section; a cutting-point; cutting edges continuous with said cutting-point, and formed upon oppositely-projecting wings, which extend continuously to the upper extremity of the skewer; and a head formed by the continuous outward flare of the body-surfaces and the wings; whereby the insertion, turning, and withdrawal of the skewer are expedited.

2. A skewer having a tapering body rounded in cross-section; a cutting-point; cutting edges continuous with said cutting-point, and formed upon oppositely-projecting wings, which extend continuously to the upper extremity of the skewer whereby the insertion, turning, and withdrawal of the skewer are expedited, substantially as described.

WALTER SCOTT SHIPE.

Witnesses:
B. BOYD,
A. MCADAM.